(12) United States Patent
Cui

(10) Patent No.: US 8,501,010 B2
(45) Date of Patent: Aug. 6, 2013

(54) DI- AND MONO-ALKOXYSILANE FUNCTIONALIZED POLYMERS AND THEIR APPLICATION IN THE BAYER PROCESS

(71) Applicant: Nalco Company, Naperville, IL (US)

(72) Inventor: Ji Cui, Aurora, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 13/645,613

(22) Filed: Oct. 5, 2012

(65) Prior Publication Data

US 2013/0032763 A1  Feb. 7, 2013

Related U.S. Application Data

(63) Continuation of application No. 12/567,196, filed on Sep. 25, 2009, now Pat. No. 8,282,834.

(51) Int. Cl.
*C02F 1/00* (2006.01)

(52) U.S. Cl.
USPC ............ 210/698; 423/114; 423/122; 423/625

(58) Field of Classification Search
USPC .......................... 210/698; 423/114, 122, 625
See application file for complete search history.

(56) References Cited

U.S. PATENT DOCUMENTS

| 2004/0011744 A1* | 1/2004 | Spitzer et al. | 210/698 |
| 2004/0162406 A1* | 8/2004 | Spitzer et al. | 526/279 |
| 2005/0010008 A2* | 1/2005 | Spitzer et al. | 526/279 |

* cited by examiner

*Primary Examiner* — Kelechi Egwim
(74) *Attorney, Agent, or Firm* — Calfee, Halter & Griswold LLP

(57) ABSTRACT

Diallcoxysilane and monoalkoxysilane functionalized polymers were applied as scale control agents in Bayer process. The polymer inhibitors reduced the quantity of aluminum silicate scale formed in spent liquor while significantly changed the morphology of the scale. Also a method is provided for reducing aluminum silicate scale of Bayer process by adding the dialkoxysilane and monoalkoxysilane functionalized polymer into the Bayer liquor stream.

18 Claims, 5 Drawing Sheets

DI- AND MONO-ALKOXYSILANE FUNCTIONALIZED POLYMERS AND THEIR APPLICATION IN THE BAYER PROCESS

CROSS-REFERENCE TO RELATED APPLICATIONS

This is a continuation application of U.S. patent application Ser. No. 12/567,196, filed Sep. 25, 2009, the disclosure of which is herein incorporated by reference in its entirety.

STATEMENT REGARDING FEDERALLY SPONSORED RESEARCH OR DEVELOPMENT

Not Applicable.

BACKGROUND OF THE INVENTION

This invention relates to compositions of matter and methods of using them to treat scale in various industrial process streams, in particular certain silane based polymers that have been found to be particularly effective in treating aluminosilicate scale in a Bayer process stream.

As described among other places in U.S. Pat. No. 6,814,873, the contents of which are incorporated by reference in their entirety, the Bayer process is used to manufacture alumina from raw Bauxite ore. Because the Bayer process uses caustic solution to extract alumina values from bauxite it is cost prohibitive to perpetually use fresh caustic solution. As a result, a caustic solution known as "liquor" and/or "spent liquor" is recycled back from later stages of the Bayer process to earlier stages and thus forms a fluid circuit. For the purposes of this application, this description defines the term "liquor". The recycling of liquor within the fluid circuit however has its own complexities.

Raw Bauxite contains silica in various forms and amounts. Some of the silica is unreactive so it does not dissolve and remains as solid sand or mud within the Bayer circuit. Other silica (for example clays and kaolinite) is reactive and dissolves in caustic when added into Bayer process liquors. As spent liquor flows repeatedly through the liquor circuit of the Bayer process, the concentration of silica in the liquor increases eventually to a point where it reacts with aluminum and soda to form insoluble aluminosilicate scale. Aluminosilicate scale comes in at least two forms, sodalite and cancrinite. These and other forms of aluminosilicate scale are commonly referred to, and for purposes of this application define, the terms "desilication product" or "DSP".

DSP can have a formula of $3(Na_2O.Al_2O_3.2SiO_2.0-2H_2O).2NaX$ where X represents $OH^-$, $Cl^-$, $CO_3^{2-}$, $SO_4^{2-}$. Because DSP has an inverse solubility (precipitation increases at higher temperatures) and can precipitate as fine scales of hard insoluble crystalline solids, its accumulation in Bayer process equipment is problematic. As DSP accumulates in Bayer process pipes, vessels, heat transfer equipment, and other process equipment, it forms flow bottlenecks and obstructions and can adversely affect liquor throughput. In addition because of its thermal conductivity properties, DSP scales on heat exchanger surfaces reduce the heat exchanger efficiency.

These adverse effects require significant downtime of Bayer process equipment, as they must be de-scaled. In addition DSP is difficult to remove and de-scaling requires the use of hazardous concentrated acids such as sulfuric acid.

Typically a "desilication" step in the Bayer process is used to reduce the concentration of silica in solution by precipitation of silica as DSP as a free precipitate rather than as scale. While such desilication reduces the overall silica concentration within the liquor, total elimination of all silica is impractical and changing process conditions within various parts of the circuit (for example within heat exchangers) can lead to changes in the solubility of the DSP and the precipitation of scale.

Some previous attempts at reducing DSP scale in the Bayer process include adding polymer materials comprising three alkyloxy groups bonded to one silicon atom as described in U.S. Pat. No. 6,814,873 B2; U.S. Patent Application Publication Nos. 2004/0162406 A1, 2004/0011744 A1, and 2005/0010008 A2; International Published Application WO 2008/045677 A1; and published article Max HT™ Sodalite Scale Inhibitor: Plant Experience and Impact on the Process, by Donald Spitzer et. al., Pages 57-62, *Light Metals* 2008 (2008), all of which contents are incorporated by reference in their entirety.

Manufacturing of these trialkoxysilane—grafted polymers however involve unwanted degrees of viscosity and low production throughput due to long reaction times. In addition, synthesis of the polymer described in WO 2008/045677 A1 is difficult as much of it tends to form jelly-like masses, which only dissolve very slowly into a NaOH solution capable of introduction into the Bayer process stream. Other previous attempts to address foulant buildup are described in U.S. Pat. Nos. 5,650,072 and 5,314,626, both of which are incorporated by reference in their entirety.

Thus there is a clear need for and utility in an improved method of preventing or reducing DSP scale formation on Bayer process equipment. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

At least one embodiment of the invention is directed towards a method for reducing scale in a Bayer process comprising the step of: adding to a Bayer liquor a scale inhibiting amount of polymer having pendant thereto a group or end group containing Formula I:

Formula I where n is an integer with a value of either 1 or 2;

n+z=3;

$R_1$ is one item selected from the list consisting of: H, $C_1$-$C_{12}$ Alkyl, Aryl, Na, K, Li, and $NH_4$; and J is selected from the group consisting of H and a hydrocarbon group having a number of carbons within the range of 1 to 20 carbons.

At least one embodiment of the invention is directed towards the method in which the polymer comprises a recurring unit of the Formula II and a recurring unit of the Formula III:

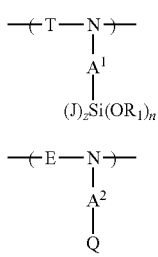

Formula II

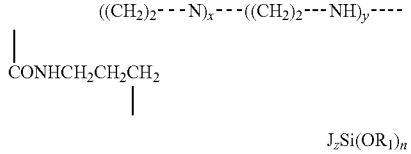

Formula III wherein:

$A^1$ and $A^2$ are each an independent hydrocarbon group having a number of carbons within the range of 1 to 20 carbons or $A^1$ and $A^2$ are each independently a direct bond between the nitrogen atom and the adjoining group;

T and E are each an independent hydrocarbon group having a number of carbons within the range of 2 to 40 carbons; and Q is selected from the group consisting of H and a hydrocarbon group having a number of carbons within the range of 1 to 20 carbons where:

the molecular weight of the polymer is at least 500;

Q does not contain a silane group;

At least one embodiment of the invention is directed towards a method using a polymer according to Formula IV:

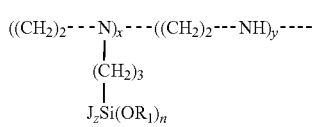

Formula IV where x=0.5-20% and y=99.5-80%; and $R_1$ is Na, K, H or C1-C12 alkyl.

At least one embodiment of the invention is directed towards a method using a polymer according to Formula V:

$((CH_2)_2\text{---}N)_x\text{---}((CH_2)_2\text{---}NH)_y\text{----}$
$\quad\quad |$
$\quad(CH_2)_3$
$\quad\quad |$
$\quad J_zSi(OR_1)_n$ Formula V where x=0.5-20% and y=99.5-80%; and $R_1$ is Na, K, H or C1-C12 alkyl.

At least one embodiment of the invention is directed towards a method using a polymer according to Formula VI:

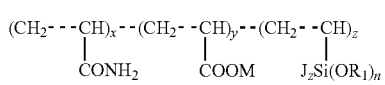

Formula VI where x=1-99%, y=1-99%, and z=0.5-20%;

M is selected from the list consisting of Na, K, Li, and $NH_4$.

At least one embodiment of the invention is directed towards a method using a graft copolymer of Formula VII and Formula VIII:

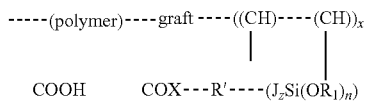

Formula VII

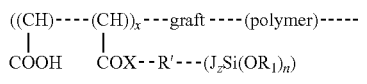

Formula VIII where x=0.1-99% (as a percentage of small molecule units in the polymer); and X is NH, NR', or O;

$R'=C_1\text{-}C_{12}$ alkyl, or aryl; and

At least one embodiment of the invention is directed towards a method using a graft copolymer of Formula IX and Formula X:

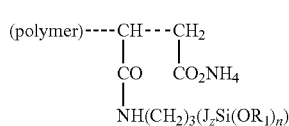

Formula IX

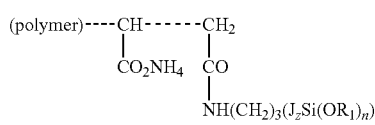

Formula X

BRIEF DESCRIPTION OF THE DRAWINGS

A detailed description of the invention is hereafter described with specific reference being made to the drawings in which.

DETAILED DESCRIPTION OF THE INVENTION

For purposes of this application the definition of these terms is as follows:

"Polymer" means a chemical compound comprising essentially repeating structural units. While many polymers have large molecular weights of greater than 500, some polymers such as polyethylene can have molecular weights of less than 500. Polymer includes copolymers and homopolymers.

"Foulant" means a material deposit that accumulates on equipment during the operation of a manufacturing and/or chemical process which may be unwanted and which may impair the cost and/or efficiency of the process. DSP is a type of foulant.

"Multiamine" means an amine molecule with more than one nitrogen atom. By this definition, polymers such as polyethyleneimine of all molecular weight ranges and small molecules such as diamines, triamines are multiamines.

"Alkyloxy" means having the structure of OX where X is a hydrocarbon and O is oxygen. It can also be used interchangeably with the term "alkoxy". Typically the oxygen is bonded both to the X group as well as to a silicon atom of the polymer. When X is $C_1$ the alkyloxy group consists of a methyl group bonded to the oxygen atom. When X is $C_2$ the alkyloxy group consists of an ethyl group bonded to the oxygen atom. When X is $C_3$ the alkyloxy group consists of a propyl group bonded to the oxygen atom. When X is $C_4$ the alkyloxy group consists of a butyl group bonded to the oxygen atom. When X is $C_5$ the alkyloxy group consists of a pentyl group bonded to the oxygen atom. When X is $C_6$ the alkyloxy group consists of a hexyl group bonded to the oxygen atom.

"Monoalkyloxy" means that attached to a silicon atom is one alkyloxy group.

"Dialkyloxy" means that attached to a silicon atom are two alkyloxy groups.

"Trialkyloxy" means that attached to a silicon atom are three alkyloxy groups.

"Synthetic Liquor" or "Synthetic Spent Liquor" is a laboratory created liquid used for experimentation whose composition in respect to alumina, soda, and caustic corresponds with the liquor produced through the Bayer process.

"True Liquor" or "True Bayer Liquor" is actual liquor that has run through a Bayer process in an industrial facility.

In the event that the above definitions or a definition stated elsewhere in this application is inconsistent with a meaning (explicit or implicit) which is commonly used, in a dictionary, or stated in a source incorporated by reference into this application, the application and the claim terms in particular are understood to be construed according to the definition in this application, and not according to the common definition, dictionary definition, or the definition that was incorporated by reference.

Figure 1:
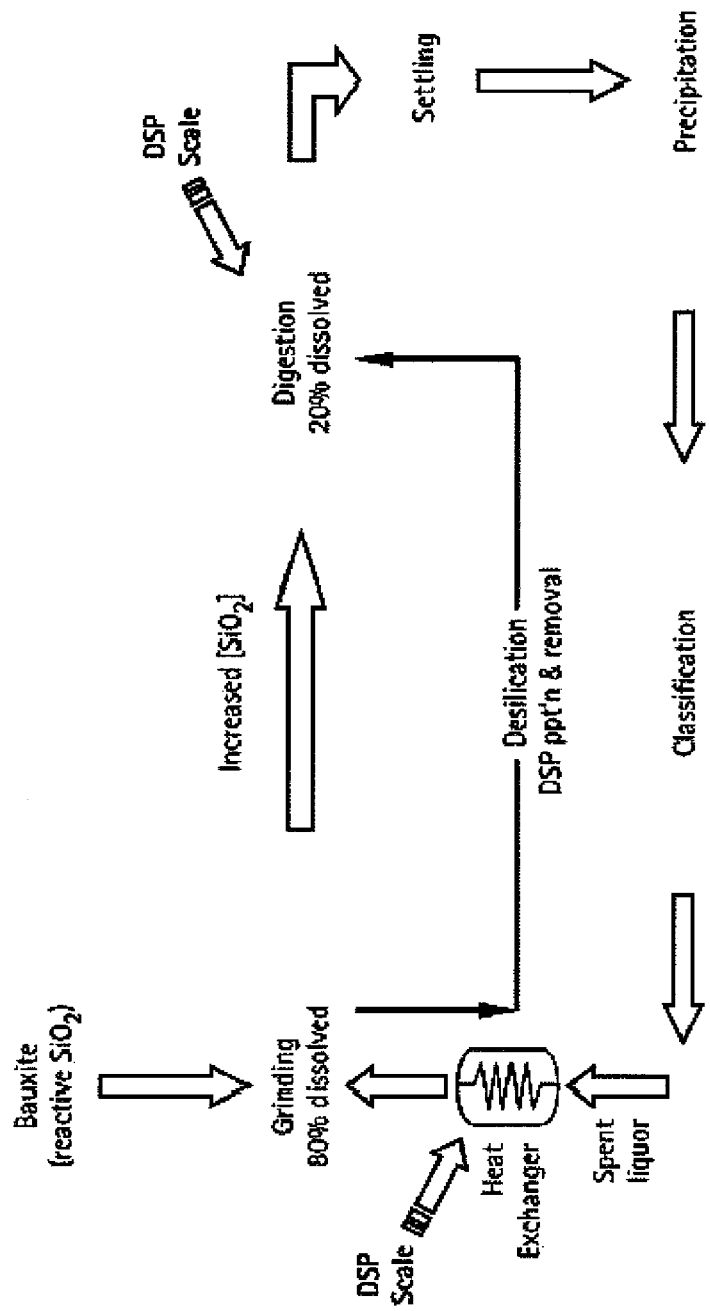
FIG. 1 is a flowchart of at least a portion of at least one (simplified) Bayer type process.
Figure 2:
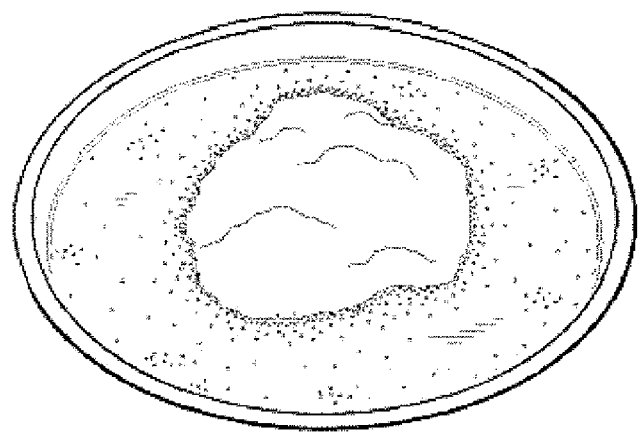
FIG. 2 is an image of a sandy crystalline solid representative of aluminosilicate scale.
Figure 3:
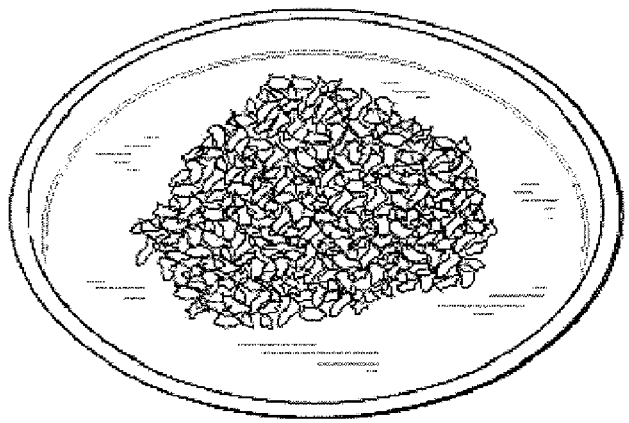
FIG. 3 is an image of a flaky solid representative of scale inhibitor modified aluminosilicate.

Referring now to FIG. 1 there is shown a flowchart illustrating at least a portion of a Bayer process for manufacturing alumina from raw bauxite ore. In at least one embodiment, raw bauxite ore containing silica passes through a grinding stage and alumina together with some impurities including silica are dissolved in added liquor. The mixture then passes through a desilication stage where more silica is precipitated as DSP to reduce the amount of Si in solution. The slurry is passed on to a digestion stage where more silica dissolves, thus more DSP is formed as the process temperature increases. The liquor is later separated from undissolved solids and alumina is recovered by precipitation as gibbsite. The spent liquor completes its circuit as it passes through a heat exchanger and back into the grinding stage. DSP scale accumulates throughout the Bayer process but particularly at the digestion stage and most particularly at or near the heat exchanger that the recycled liquor passes through.

In this invention, it was discovered that dosing of various types of silane-based products can not only extend the induction time of scale formation, but can also alter the morphology of the scale. In at least one embodiment of the invention, a polymer is added to some point or stage in the liquor circuit in the Bayer process, which minimizes or prevents the accumulation of DSP on vessels or equipment along the liquor circuit. In at least one embodiment the polymer has a group bonded to a silicon atom pendant thereto to form the group $-J_zSi(OR_1)_n$, where n=1 or 2 and $R_1$=H, $C_1$-$C_{12}$ Alkyl, Aryl, Na, K, Li, or $NH_4$.

As explained in more detail below, in a number of embodiments the polymers resemble those disclosed in WO 2008/045677 except instead of the silane group having a trialky-loxy configuration it instead has a dialkyloxy or a monoalkyloxy configuration. Contemplated embodiments include these dialkyloxy or a monoalkyloxy silane group bearing polymers used according to the methods described in WO 2008/045677.

The prior art only contemplated polymers having silane groups with a trialkyloxy configuration because they are readily available, are inexpensive, and were the only ones presumed to work. This presumption was based on the fact that the dialkyloxy or a monoalkyloxy groups are less polar so they were presumed to be not reactive enough and too hydrophobic to be effective. This is because the three $OR_1$ groups in a trialkyloxy configuration create a more polar local environment than the monoalkyloxy and dialkyloxy configurations.

Ironically, one problem with the prior art polymers having silane groups with a trialkyloxy configuration is that because of their extreme polarity they are too reactive and bind indiscriminately. As a result, while they do interact somewhat with DSP, they also interact with other mineral particles such as red mud and $Al(OH)_3$ which is not desirable. Page 59 ¶ 7 *Light Metals* 2008, (2008). In some cases the polymers having silane groups with a trialkyloxy configuration are so reactive that they must be overdosed to compensate for lost polymer that binds with other compounds in the Bayer process. In contrast, polymers having silane groups with a dialkyloxy and monoalkyloxy configuration may have a more modulated polarity and reactivity and are better for selectively targeting DSP and not interacting with other Bayer process chemicals and/or reagents.

In at least one embodiment the polymer comprises a recurring unit of the Formula (I) and optionally a recurring unit of the Formula (II):

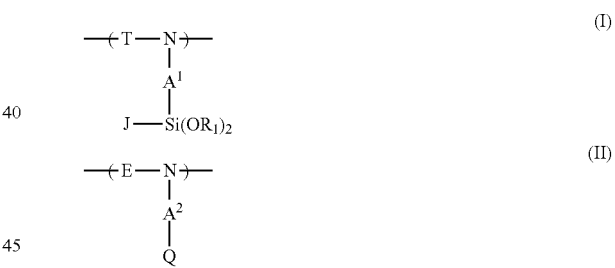

wherein:

T and E are each independently a first optionally substituted hydrocarbyl radical comprising from about 2 to about 40 carbons;

Q is H or a second optionally substituted hydrocarbyl radical comprising from about 1 to about 20 carbons;

$A^1$ and $A^2$ are each independently a direct bond or an organic connecting group comprising from about 1 to about 20 carbons;

$R_1$ is an optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NH_4$, where each $R_1$ is independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl, Group I metal ion, Group II metal ion, or $NH_4$;

J is an optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, or H. The polymer has a weight average molecular weight of at least about 500; and Q does not contain a silane group.

In at least one embodiment the polymer is monoalkyloxy so it has 2 J groups and one $OR_1$ group bonded to the Si.

Another embodiment provides a composition comprising a polymeric reaction product of at least a multiamine, a first nitrogen-reactive compound, and a second nitrogen-reactive compound, the polymeric reaction product having a weight average molecular weight of at least about 500, wherein:

the first nitrogen-reactive compound comprises a J-Si$(OR)_2$ group and a nitrogen-reactive group, where R and J are each one optionally selected from H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NH_4$, each J and R being independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl, Group I metal ion, Group II metal ion, or $NH_4$;

the second nitrogen-reactive compound comprises a nitrogen-reactive group and does not contain a silane group, including dialkoxysilane, trialkoxysilane and monoalkoxysilane;

and at least one of the multiamine and the second nitrogen-reactive compound comprises an optionally substituted hydrocarbyl radical comprising from about 2 to about 40 carbons.

T and E are each independently a first optionally substituted hydrocarbyl radical comprising from about 2 to about 40 carbons;

Q is H or a second optionally substituted hydrocarbyl radical comprising from about 1 to about 20 carbons;

$A^1$ and $A^2$ are each independently a direct bond or an organic connecting group comprising from about 1 to about 20 carbons; and $R_1$ is optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$, where each $R^1$ is independently selected from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl. This can also be in the form of a monoalkyloxy having two J groups and one $OR_1$ group bonded to the Si.

In other embodiments contemplated by the invention, monoalkyloxy and dialkyloxy polymers of the trialkyloxy polymers described in U.S. Patent Application Publication Nos. 2004/0162406, 2004/0011744, 2005/0010008, and U.S. Pat. No. 6,814,873 are used to inhibit the growth of DSP scale.

In at least one embodiment the polymer added is commercially available (from the Gelest Company of Morrisville, Pa.) dimethoxysilyl-polypropylene oxide, or bis [(3-methyl-dimethoxysilylpropyl)]polypropyleneoxide (CAS number 75009-80-0).

In at least one embodiment the composition of matter added to the Bayer process is a "tuned" mixture of different inhibitors targeted towards the specific environment of a specific Bayer process. In at least one embodiment the tuning involves increasing the proportion of more polar alkyloxy molecules in relation to higher concentrations of DSP. In at least one embodiment the tuning involves increasing the proportion of less polar alkyloxy molecules in relation to a higher concentration of other mineral particles such as red mud and $Al(OH)_3$. In this context it is understood that trialkyloxy inhibitors are more polar than dialkyloxy polymers, which are themselves more polar than monoalkyloxy polymers.

EXAMPLES

The following examples are presented to describe embodiments and utilities of the invention and are not meant to limit the invention unless otherwise stated in the claims.

Example 1

Polypropylene bottles and a temperature controlled rotary water bath were used under isothermal conditions for batch desilication experiments. Synthetic spent Bayer liquor was prepared on the same day or one day prior to the experiment. Typical analysis for the synthetic liquor used was:

Alumina (A): 84.62 g/L as $Al_2O_3$;
Caustic (C): 238.42 g/L as $Na_2CO_3$;
Ratio of A to C: 0.355.

A series of tests were conducted by adding a silane based polymer to the bottles containing synthetic spent Bayer liquor (50 mL). The synthetic liquor was heated in the water bath and as the desired temperature (95° C.) was reached, sodium metasilicate solution was added. (A calculated amount to give the starting $SiO_2$ concentration of 0.05M was added.) The resulting solutions were heated and held at 95° C. for the duration of the test (4 hours). Samples of the synthetic liquor were then removed.

Morphology was assessed by visual inspection of the crystalline material resulting from each test.

One of the polymer inhibitors tested was a commercially available dimethoxysilyl-polypropylene oxide. It appeared to significantly alter the morphology of the resulting crystalline product from sandy to flaky crystals.

Example 2

Another dialkoxysilane modified polymer was synthesized by a method similar to the method disclosed in Example 2 of Published International Patent Application No. WO2008/045677. Ten grams of polyethyleneimine (Lupasol WF, BASF) is first diluted in 10.0 g of ethyl alcohol to reduce the viscosity, and then mixed with 2.19 g of glycidoxypropylmethyldimethoxysilane (instead of the trialkyloxy polymer used in WO2008/045677), and 0.64 g glycidyl 4-nonylphenylether. The mixture was maintained at 60° C. for 1 hour and then dissolved in 2% NaOH to make a 10% dialkyloxysilane modified polyethyleneimine. In contrast, whether it was or was not diluted with alcohol, the reaction mixture gelled in 45 minutes if glycidoxypropyltrimethoxysilane is used. The gelled product is very difficult to dissolve in NaOH and therefore very difficult to transfer out of reactors.

The dialkyloxysilane modified polyethyleneimine was tested in true Bayer process spent liquor. The true Bayer liquor had a caustic concentration of 249.84 g/L, and C/S (Caustic/Soda) ratio of 0.82 and A/C ratio of 0.192. Sodium silicate solution (40% by weight) was added to the real Bayer liquor at 1.0%, to raise the silica level. Dialkyloxysilane modified polyethyleneimine was then added at 50 ppm (active polymer) into the silica-spiked spent liquor and the mixture was poured into a stainless steel cup. The cup was sealed with polymer-coated Al foil and immersed in a heated silicone oil bath at 110° C. for 2 hours without stirring. After the heating, the mixture was cooled down to room temperature in 5 hours, and kept at room temperature for additional 9 hours. The resulting solid precipitate was washed, centrifuged, dried and weighed. When compared to a control sample that had no scale inhibitor added, the dialkyloxy silane modified PEI gave 35% less scale. The inventive inhibitor is demonstrably effective in inhibiting scale in these conditions.

Example 3

Figure 4:
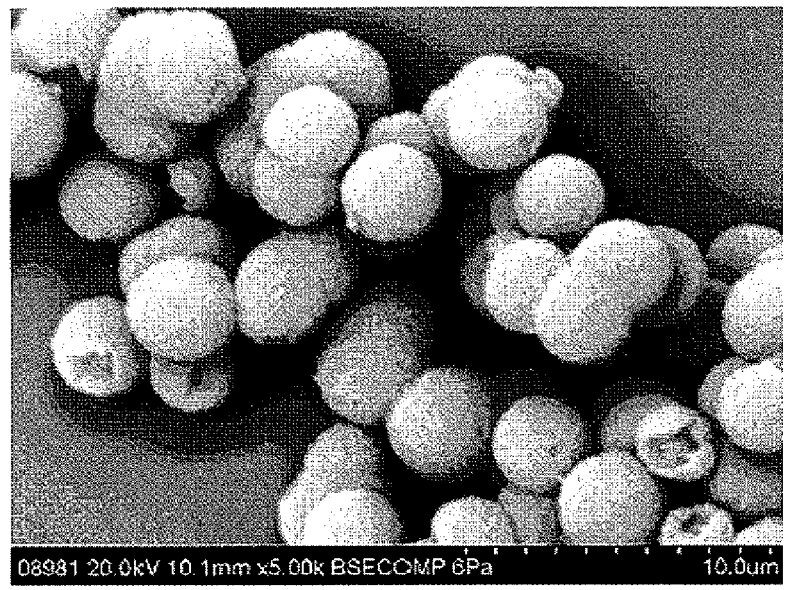
FIG. 4 is an electron microscope image of untreated DSP.
Figure 5:
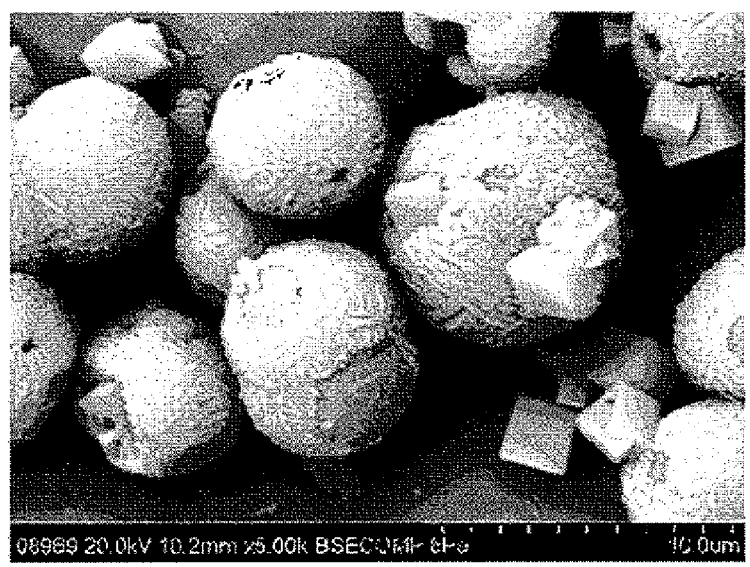
FIG. 5 is an electron microscope image of DSP treated with a trialkyloxy silane functionalized polymer.
Figure 6:
FIG. 6 is an electron microscope image of DSP treated with a dialkyloxy silane functionalized polymer.

Referring now to FIGS. 4, 5 and 6, there are shown SEM (Scanning Electron Microscope) images of DSP from true Bayer process liquor. FIG. 4 shows DSP from a control sample with no scale inhibitor. The untreated DSP in the control is small fine particles which easily accumulate on process equipment. FIG. 6 shows DSP treated by the prior art inhibitor disclosed in WO2008/045677 and FIG. 7 shows DSP treated by the inventive dialkyloxy silane polymer. In both FIGS. 6 and 7, it is shown that the inhibitors reduce the fouling effects of DSP by altering its morphology and size. The inhibited DSP particles are much larger spheres which aggregate into flakes that do not accumulate as readily on Bayer process equipment. A side effect of the treatment of Bayer liquor with these inhibitors is the production of cubes of sodium aluminum silicate crystals.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the team "comprising" means "including, but not limited to." Those familiar with the art may recognize other equivalents to the specific embodiments described herein which equivalents are also intended to be encompassed by the claims.

All ranges and parameters disclosed herein are understood to encompass any and all subranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, end ending with a maximum value of 10 or less, e.g., 2.3 to 9.4, 3 to 8, 4 to 7, and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A composition comprising:
a polymer having pendant thereto a group or end group containing Formula I:

Formula I where n is an integer of either 1 or 2;

n+z=3;

$R_1$ is one item selected from the list consisting of: H, $C_1$-$C_{12}$ Alkyl, Aryl, Na, K, Li, and $NH_4$; and J is selected from the group consisting of H and a hydrocarbon group having a number of carbons within the range of 1 to 20 carbons; and a Bayer liquor comprising silica.

2. The composition of claim 1 wherein the polymer comprises a recurring unit of the Formula II and a recurring unit of the Formula III:

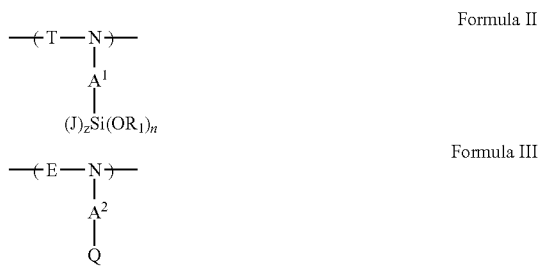

Formula II

Formula III wherein:

$A^1$ and $A^2$ are each an independent hydrocarbon group having a number of carbons within the range of 1 to 20 carbons or $A^1$ and $A^2$ are each independently a direct bond between the nitrogen atom and the adjoining group;

T and E are each an independent hydrocarbon group having a number of carbons within the range of 2 to 40 carbons; and Q is selected from the group consisting of H and a hydrocarbon group having a number of carbons within the range of 1 to 20 carbons where:

the molecular weight of the polymer is at least 500; and

Q does not contain a silane group.

3. The composition of claim 1 wherein the polymer is according to formula IV:

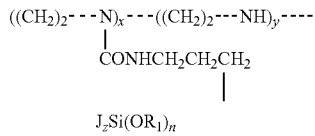

where x=0.5-20% and y=99.5-80%.

4. The composition of claim 1 wherein the polymer is according to formula V:

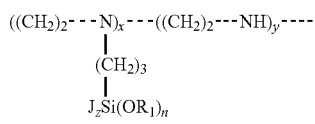

where x=0.5-20% and y=99.5-80%.

5. The composition of claim 1 wherein the polymer is according to formula VI:

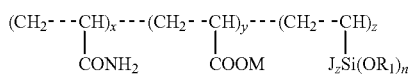

where
x=1-99%, y=1-99%, and z=0.5-20%;
M is selected from the list consisting of Na, K, Li, and $NH_4$.

6. The composition of claim 1 wherein the polymer is a graft copolymer of formula VII and formula VIII:

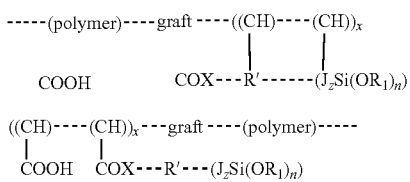

where
x=0.1-99% (as a percentage of small molecule units in the polymer); and
X is NH, NR', or O;
$R'=C_1-C_{10}$ alkyl, or aryl.

7. The composition of claim 1 wherein the polymer is a graft copolymer of formulas IX and X:

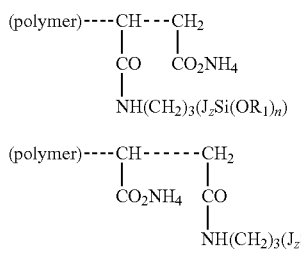

8. The composition of claim 1 wherein the polymer is one selected from the list consisting of: bis [(3-alkyl-dialkoxysilylpropyl)]polypropyleneoxide, bis [(3-alkyl-dialkoxysilylpropyl)]polyethyleneoxide, and any combination thereof.

9. The composition of claim 1 wherein the polymer is bonded to at least a portion of the silica of the Bayer liquor.

10. A composition comprising:
a polymer having pendant thereto a group or end group containing Formula I:

where
n is an integer of either 1 or 2;
n+z=3;
$R_1$ is one item selected from the list consisting of: H, $C_1-C_{12}$ Alkyl, Aryl, Na, K, Li, and $NH_4$; and
J is selected from the group consisting of H and a hydrocarbon group having a number of carbons within the range of 1 to 20 carbons; and
an amount of a silicon-comprising foulant.

11. The composition of claim 9 wherein the polymer comprises a recurring unit of the Formula II and a recurring unit of the Formula III:

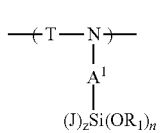

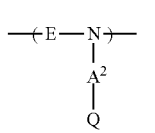

wherein:
$A^1$ and $A^2$ are each an independent hydrocarbon group having a number of carbons within the range of 1 to 20 carbons or $A^1$ and $A^2$ are each independently a direct bond between the nitrogen atom and the adjoining group;
T and E are each an independent hydrocarbon group having a number of carbons within the range of 2 to 40 carbons; and
Q is selected from the group consisting of H and a hydrocarbon group having a number of carbons within the range of 1 to 20 carbons where:
the molecular weight of the polymer is at least 500; and
Q does not contain a silane group.

12. The composition of claim 10 wherein the polymer is according to formula IV:

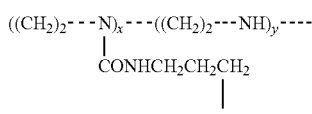

where
x=0.5-20% and y=99.5-80%.

13. The composition of claim 10 wherein the polymer is according to formula V:

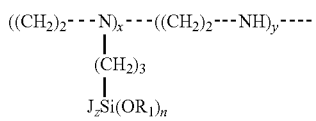

where
x=0.5-20% and y=99.5-80%.

14. The composition of claim 10 wherein the polymer is according to formula VI:

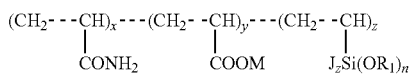

where
x=1-99%, y=1-99%, and z=0.5-20%;
M is selected from the list consisting of Na, K, Li, and $NH_4$.

15. The composition of claim 10 wherein the polymer is a graft copolymer of formula VII and formula VIII:

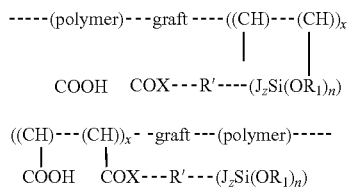

Formula VII

Formula VIII where
x=0.1-99% (as a percentage of small molecule units in the polymer); and
X is NH, NR', or O;
R'=$C_1$-$C_{10}$ alkyl, or aryl.

16. The composition of claim 10 wherein the polymer is a graft copolymer of formulas IX and X:

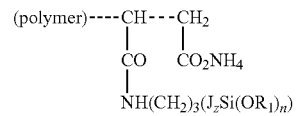

Formula IX

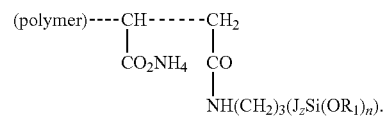

Formula X

17. The composition of claim 10 wherein the polymer is one selected from the list consisting of: bis [(3-alkyl-dialkoxysilylpropyl)]polypropyleneoxide, bis [(3-alkyl-dialkoxysilylpropyl)]polyethyleneoxide, and any combination thereof.

18. The composition of claim 10 wherein the polymer is bonded to at least a portion of the amount of the silicon-comprising foulant.

* * * * *